US012717419B2

(12) United States Patent
Verma et al.

(10) Patent No.: US 12,717,419 B2
(45) Date of Patent: Aug. 25, 2026

(54) USER LOCATION DETERMINATION BASED ON OBJECT INTERACTIONS

(71) Applicant: Apple Inc., Cupertino, CA (US)

(72) Inventors: Eshan Verma, San Francisco, CA (US); Angela Blechschmidt, San Jose, CA (US); Gefen Kohavi, San Carlos, CA (US); Zhihao Zhu, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/384,986

(22) Filed: Oct. 30, 2023

(65) Prior Publication Data

US 2024/0212201 A1 Jun. 27, 2024

Related U.S. Application Data

(60) Provisional application No. 63/434,772, filed on Dec. 22, 2022.

(51) Int. Cl.
*G06F 3/01* (2006.01)
*G06T 7/73* (2017.01)
*G06T 19/00* (2011.01)

(52) U.S. Cl.
CPC .............. *G06F 3/017* (2013.01); *G06F 3/013* (2013.01); *G06T 7/73* (2017.01); *G06T 19/006* (2013.01); *G06T 2207/30196* (2013.01); *G06T 2219/004* (2013.01)

(58) Field of Classification Search
CPC ............. G06F 3/011–015; G06F 3/017; G06F 3/04815; G06F 2203/04802; G06F 3/04845; G06V 20/20; G06V 20/653; G06T 7/75; G06T 19/006; G06T 7/70; G06T 19/20; G06T 2219/2004
See application file for complete search history.

(56) References Cited

U.S. PATENT DOCUMENTS

2009/0046893 A1* 2/2009 French ............... A63B 24/0021 382/103
2010/0302015 A1* 12/2010 Kipman .................. A63F 13/42 340/407.1
2015/0150818 A1 6/2015 Mousa et al.
2015/0302665 A1* 10/2015 Miller ..................... G06F 3/016 345/419
2018/0299956 A1* 10/2018 Chen ....................... A63F 13/67
(Continued)

FOREIGN PATENT DOCUMENTS

KR 20140036543 A 3/2014

*Primary Examiner* — Sanjiv D. Patel
(74) *Attorney, Agent, or Firm* — Thompson Hine LLP

(57) ABSTRACT

Various implementations disclosed herein include devices, systems, and methods that determine a user location within a physical environment. For example, an example process may include obtaining an object relationship model representing positional relationships between objects of a set of objects within a physical environment. The process may further include obtaining sensor data of the physical environment. The process may further include detecting an interaction of a user with an object of the set of objects within the physical environment based on the sensor data. The process may further include determining a location of the user within the physical environment based on a location associated with the object in the physical environment.

19 Claims, 7 Drawing Sheets

(56) References Cited

U.S. PATENT DOCUMENTS

2021/0097714 A1 4/2021 Grundhoefer
2021/0125414 A1* 4/2021 Berkebile ............... G06T 17/00
2022/0070289 A1* 3/2022 Duffy ........................ G06F 8/38
2022/0121276 A1* 4/2022 Saito ...................... G06V 20/20
2022/0222900 A1 7/2022 Tomizuka et al.
2022/0308654 A1* 9/2022 Chen ....................... A63F 13/65

* cited by examiner

USER LOCATION DETERMINATION BASED ON OBJECT INTERACTIONS

CROSS-REFERENCE TO RELATED APPLICATIONS

This application claims the benefit of U.S. Provisional Application Ser. No. 63/434,772 filed Dec. 22, 2022, which is incorporated herein in its entirety.

TECHNICAL FIELD

The present disclosure generally relates to systems, methods, and devices that determine user locations based on object interaction detections.

BACKGROUND

It may be desirable to determine a user location within an environment while the user is using a device, such as a mixed reality headset. However, existing systems may require utilization of a relatively large amount of processing and/or power resources to detect a user location, for example, because such systems may require constructing a map of an unknown environment using computationally-intensive techniques while simultaneously tracking a user location also using computationally-intensive techniques.

SUMMARY

Various implementations disclosed herein include systems, methods, and devices that provide localization of a user within a scene based on associated interactions with one or more objects while using an electronic device. For example, an electronic device (e.g., a mobile device or wearable device such as a head mounted display (HMD)) may be enabled to determine a location (e.g., a specific location or region) of a user within a physical environment based on sensor detected interaction(s) between a user and an object described within an object relationship model, where the electronic device obtains sensor data (e.g., collected from image sensors, motion sensors, audio sensors, etc.) from the physical environment for detecting the interaction(s) between the user and the object. In some implementations, detecting the interaction(s) between the user and an object may include one or more of detecting contact between the user and the object, detecting a position of the user relative to the object, detecting a change in orientation of the user relative to the object, detecting a gaze of the user relative to the object, detecting a time period associated with the object being in a view of the user, detecting a distance between the object and the user, etc.

In some implementations, content may be provided for the user via an output device (e.g., display, speaker, etc.) of the electronic device based on the determined location of the user within the physical environment. For example, the content may include: HMD or mobile device augmentations selected and/or positioned based on the determined location of the user, an activity associated with the determined location of the user, user prior activity at the determined location of the user, etc.

In some implementations, an electronic device has a processor (e.g., one or more processors) that executes instructions stored in a non-transitory computer-readable medium to perform a method. The method performs one or more steps or processes. In some implementations, the electronic device obtains an object relationship model representing positional relationships between objects within a physical environment. At least one object (of the objects) is associated with a location in the physical environment. Sensor data associated with the physical environment is obtained and an interaction of a user with an object of (the objects) within the physical environment is detected based on the sensor data. A location of the user, within the physical environment, is determined based on a location associated with the object with respect to the object relationship model.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
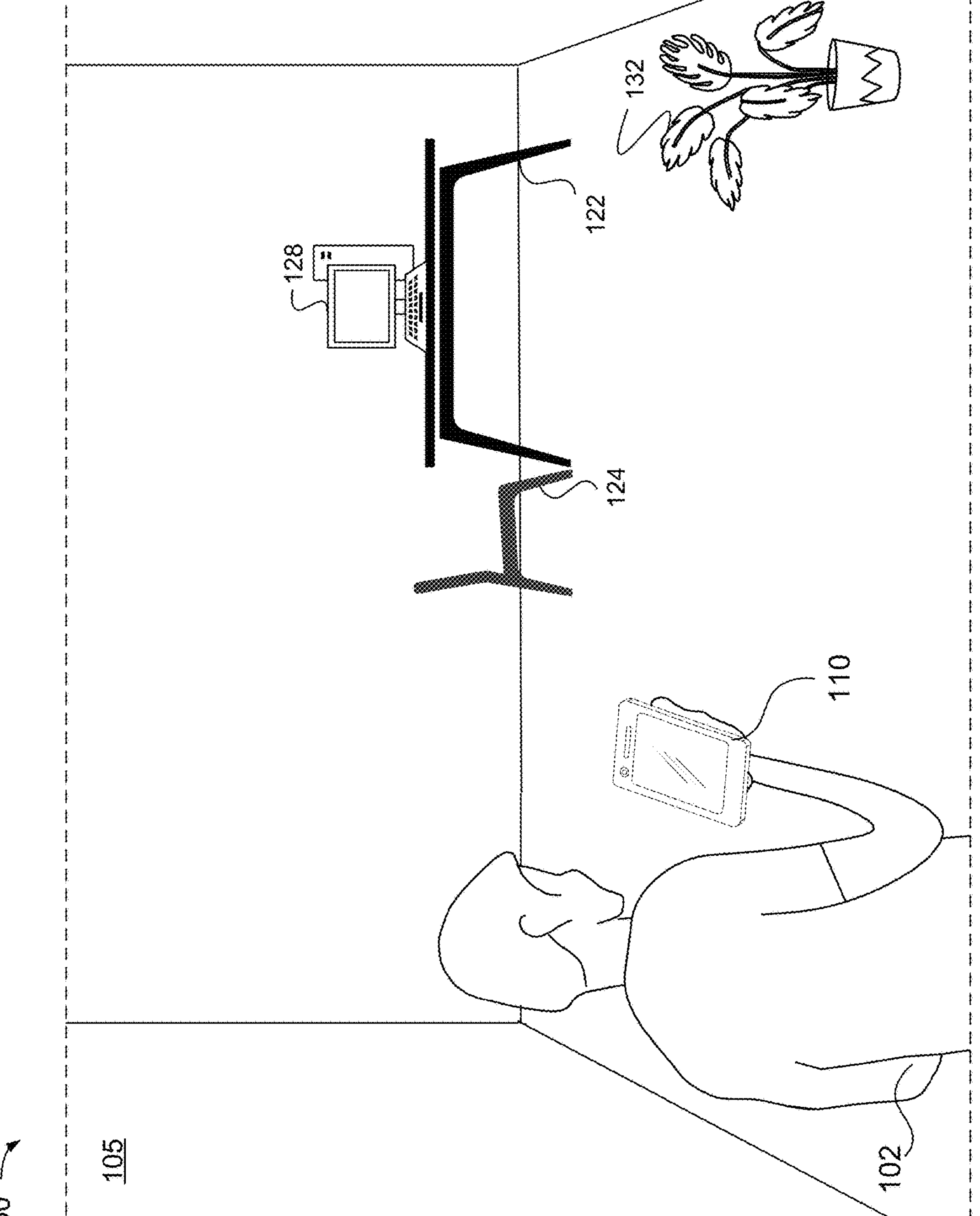
FIG. 1 is an example operating environment, in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates an example operating environment 100 in accordance with some implementations. In this example, the example operating environment 100 illustrates an example physical environment 105 that includes physical objects such as a table 122, a chair 124, a computer 128, and a plant 132. Additionally, example physical environment 105 includes a user 102 holding device 110. While pertinent features are shown, those of ordinary skill in the art will appreciate from the present disclosure that various other features have not been illustrated for the sake of brevity and so as not to obscure more pertinent aspects of the example implementations disclosed herein.

In some implementations, the device 110 is configured to present an environment to the user 102. In some implementations, the device 110 is a handheld electronic device (e.g., a smartphone or a tablet). In some implementations, the device 110 has a touchpad and, in some implementations, the device 110 has a touch-sensitive display (also known as a "touch screen" or "touch screen display"). In some implementations, the user 102 wears the device 110 on his/her head (e.g., a wearable head mounted display (HMD)). As such, the device 110 may include one or more displays provided to display content. For example, the device 110 may enclose the field-of-view of the user 102.

In some implementations, the functionalities of device 110 are provided by more than one device. In some implementations, the device 110 communicates with a separate controller or server to manage and coordinate an experience for the user. Such a controller or server may be local or remote relative to the physical environment 105.

Figure 2:
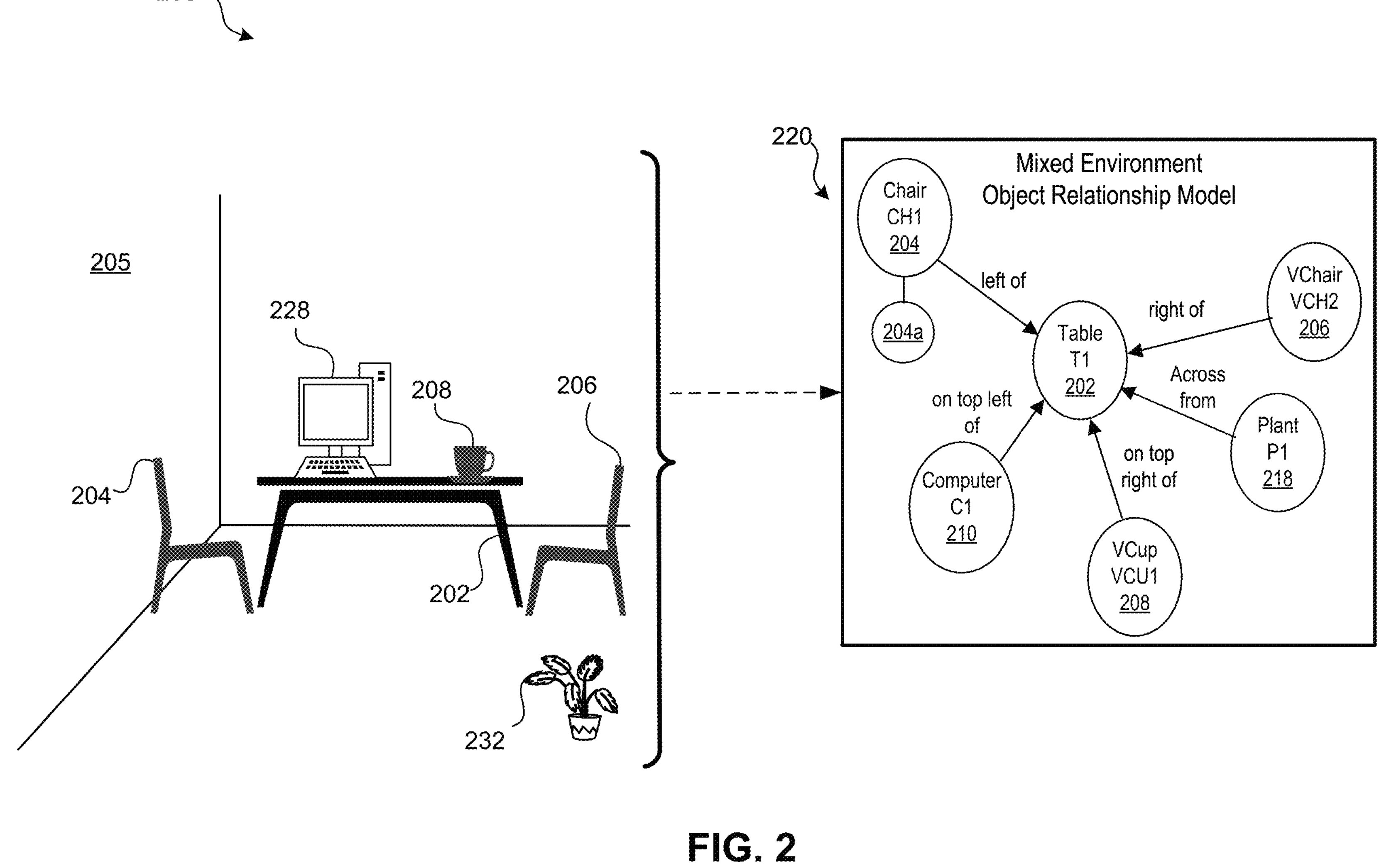
FIG. 2 illustrates an example extended reality (XR) environment and a mixed environment object relationship model representing relationships between physical objects and virtual objects in the XR environment, in accordance with some implementations.

FIG. 2 illustrates an example environment 200 in accordance with some implementations. The example environment 200 illustrates an example XR (extended reality) representation 205 of a physical environment (e.g., such as physical environment 105 of FIG. 1 such as a room, a building, etc.), that includes representations of physical objects such as a table 202, a chair 204 (associated with data **204*a* describing a known physical location for chair 204*a* in physical environment 200), a computer 228, and a plant 232 and virtual objects, such as a virtual chair 206 and a virtual cup 208 that are located on top of the table 202. Additionally, FIG. 2 illustrates an object relationship model 220 (e.g., a mixed environment object relationship model for the example XR representation 205). The object relationship model 220 represents example relationships between the representations of the physical objects (e.g., table 202, chair 204, computer 228, and plant 232) and virtual objects (e.g., chair 206 and cup 208) in the representation 205 in accordance with some implementations. The object relationship model 220 may include data such (e.g., user input data including a floorplan for e.g., a room, input data (downloaded from a server) including a floorplan e.g., for a room downloaded from a server, etc.) indicating known physical locations for each of the physical objects (e.g., table 202, chair 204, computer 228, and plant 232) and each of the virtual objects (e.g., chair 206 and cup 208) in accordance with some implementations. A known physical location may be associated with an x, y coordinate within a floor plan represented via an object relationship model (e.g., object relationship model 220**). Alternatively, a known physical location may be associated with a general region (e.g., a specified room such as, inter alia, a living room, a dining room, a bedroom, a kitchen, etc.) or a sub-region within a room (e.g., a counter top in a kitchen, a bed in a bedroom, a desk in an office, etc.) presented in a floor plan represented via an object relationship model. In some implementations, each of the known physical locations may be determined or detected via retrieval of user or server input during a device setup or initialization process. In some implementations, each of the known physical locations may be detected via sensors during an object detection or room scanning process.

In this example, the object relationship model 220 includes a first object, table "T1" 202, a second object, chair "CH1" 204, a third object, computer "C1" 201, a fourth object, plant "P1" 218, a fifth object, virtual chair "VCH2" 206, and a sixth object, virtual cup "VCU1" 208. The example object relationship model 220 identifies relationships between each object. For example, the object relationship model 220 includes a first relationship that identifies that the chair CH1 204 is "left of" table T1 202. A second relationship identifies that the computer C1 210 is "on top left of" the table T1 202. A third relationship identifies that the virtual cup VCU1 208 is "on top right of" the table T1 202. A fourth relationship identifies that the virtual chair CH2 206 is "right of" the table T1 202. A fifth relationship identifies that the plant P1 218 is "across from" the table T1 202. It should be noted that the relationships illustrated in the object relationship model 220 need not be limited to holding only one label—two, three, or more labels per relationship may be used.

A 3D representation (e.g., XR representation 205) may represent the 3D geometries of surfaces of a physical environment using a mesh, point cloud, or any other data structure. The data structure may include semantic information (e.g., a semantic mesh, a semantic point cloud, etc.) identifying semantic labels for data elements (e.g., semantically-labelled mesh points or mesh surfaces, semantically-labelled cloud points, etc.) that correspond to an object type, e.g., wall, floor, door, table, chair, cup, computer, plant, etc.

The sensor data, data structures generated based on sensor data, and/or associated semantic information may be used to generate object relationship models, for example, using an algorithm or machine learning method trained to input such data and output an object relationship model. An object relationship model may be represented as a graph, e.g., as data identifying objects and relationships amongst the objects that may be visually or conceptually represented in a 2D or 3D graphical form. In some implementations, an object relationship model is generated by transforming a semantic mesh into a graph. In some implementations, an object relationship model is generated by transforming a point cloud into a graph. In some implementations, a physical environment (e.g., physical environment 105) is represented by object information that identifies objects and their 2D or 3D positions, e.g., using 2D or 3D bounding boxes, and the representation of the physical environment is transformed into a graph. In some implementations, the objects and relative 2D or 3D locations of the objects (e.g., or their respective bounding boxes) in 2D or 3D coordinates are used to determine room type, objects, object-to-object relationships, meta information (e.g., color, material, etc.), and features that are represented in a graph.

In some implementations, the 3D shape of a semantic mesh represents surfaces of objects of a physical environment and at least some of the vertices of the semantic mesh have semantic labels identifying object type (e.g., table, chair, vase, etc.). In such a mesh, for example, vertices on the floor surface may be labelled "floor", vertices on a chair's surfaces may be labelled "chair."

In some implementations, generating a semantic mesh involves estimating depths of different portions (e.g., pixels) of multiple images of a physical environment, correlating relationships (e.g., transforms) between poses of a camera used to capture the images, and generating a 3D mapping or other reconstruction of surfaces in the physical environment. Such a mapping/reconstruction may include locations in a 3D coordinate system for different surface points. In some implementations, a 3D triangle-based mesh is generated and each vertex of the mesh stores or otherwise is associated with a location, e.g., x,y,z positional information. One or more machine learning methods may be used to generate a 3D reconstruction. A machine learning method may include machine learning algorithms (e.g., PCA, clustering algorithms, etc.) and/or machine learning models (e.g., neural network-based approaches).

In some implementations, generating a semantic mesh involves techniques that do not utilize a machine learning method. For example, one exemplary method uses an algorithm to project vertices of a 3D reconstruction mesh onto semantic segmentation images from different viewpoints and then uses a majority voting technique to determine final vertices labels.

In some implementations, semantic information is included in or added to a 3D reconstruction of a physical environment. One or more machine learning methods may be used to classify objects, include, or add semantic information to a 3D reconstruction. In some implementations, a machine learning method is used to generate semantic labels for pixels of one or more images of the physical environment. Such semantic labels may be associated with corresponding portions of a 3D reconstruction based on determining associations between images and the 3D reconstruction. In some implementations, a machine learning method uses a 3D reconstruction and semantically labelled images (e.g., automatically labelled images) as input to produce a semantically-labeled mesh, e.g., a semantic mesh having at least some vertices that are associated with semantic labels.

In some implementations, transforming the semantic mesh into a graph involves converting the vertices of the semantic mesh to nodes and determining edges connecting nearby nodes to one another. The edges of the graph may represent the sides of the faces of the semantic mesh. The nodes may store information about the coordinates (e.g., x, y, z coordinates), semantic labels, and other information extracted from the semantic mesh.

In some implementations, graph reduction reduces the complexity of the original semantic mesh or the graph representing the original semantic mesh, for example, reducing the number of nodes in such a graph. In some implementations, instance detection involves identifying or estimating separate instances of objects in the semantic mesh or graph representing the semantic mesh. In some implementations, instance detection is performed using a machine learning method that utilizes semantic locations and 3D locations of nodes of the graph to identify instances.

In some implementations, a machine learning method is used to estimate relationships between objects of the semantic mesh or graph representing the semantic mesh. Such relationships may be determined based on sensor data or other data derived from sensor data, including, but not limited to a semantic mesh or graph. Examples of relationships include, but are not limited to, estimations that a first object is on top of a second object, a first object is under a second object, a first object is next to a second object, a first object is in contact with a second object, a first object is attached to a second object, a first object is leaning on a second object, a first object (e.g., a person) is holding a second object, a first object is within a second object, a first object is hanging from a second object, a first object is close to a second object, a first object is facing towards a second object, a first object is facing away from a second object, a first object is in front of a second object, a first object is behind a second object, and a first object and a second object are aligned with one another.

In some implementations, the relationships between objects that are produced by the machine learning method are estimated as probabilities, e.g., providing a 99% chance that table T1 is on top of floor F1, a 90% chance that cup VCU1 is on top of table T1, a 75% chance that chair CH1 is next to table T1, a 75% chance that chair VCH2 is facing computer C1, a 75% chance that a handle H1 is attached to a door D1, etc.

An image of the physical environment and/or pose information about the position and orientation of a camera capturing the image may additionally be input to the machine learning method to further improve its accuracy or efficiency. Camera pose information may be used to produce viewpoint-specific relationships. For example, if an XR environment is being produced using live images, the pose (e.g., location and orientation) of the user's current device may be used to facilitate a viewpoint-specific relationship determination, e.g., identifying that, from the user's current viewpoint, the chair is in front of the table.

In some implementations, the machine learning method outputs a graph representing the objects and their relationships, e.g., object relationship model 220. In some implementations, the machine learning method outputs pairwise relationships between objects. A relationship between two or more objects may be represented in any suitable format for output and use.

In some implementations, a graph representing objects of a physical environment represents the (physical) locations of those objects, e.g., within a 3D coordinate system or a 2D coordinate system. In one example, the graph represents center points of one or more objects, sizes of one or more objects, boundary boxes representing the positions of one or more objects, etc. In some implementations, the locations of one or more objects is determined based on assessing sensor data or data derived from sensor data including, but not limited to, 3D model/representations of the physical environment and/or semantic labeling or other object type information regarding the physical environment. In some implementations the locations of one or more objects is determined based on retrieving video representations (retrieved via video retrieval devices such as a camera(s)) of the physical environment and mapping objects in the video representations to descriptions and/or sensed locations in the physical environment.

Figure 3:
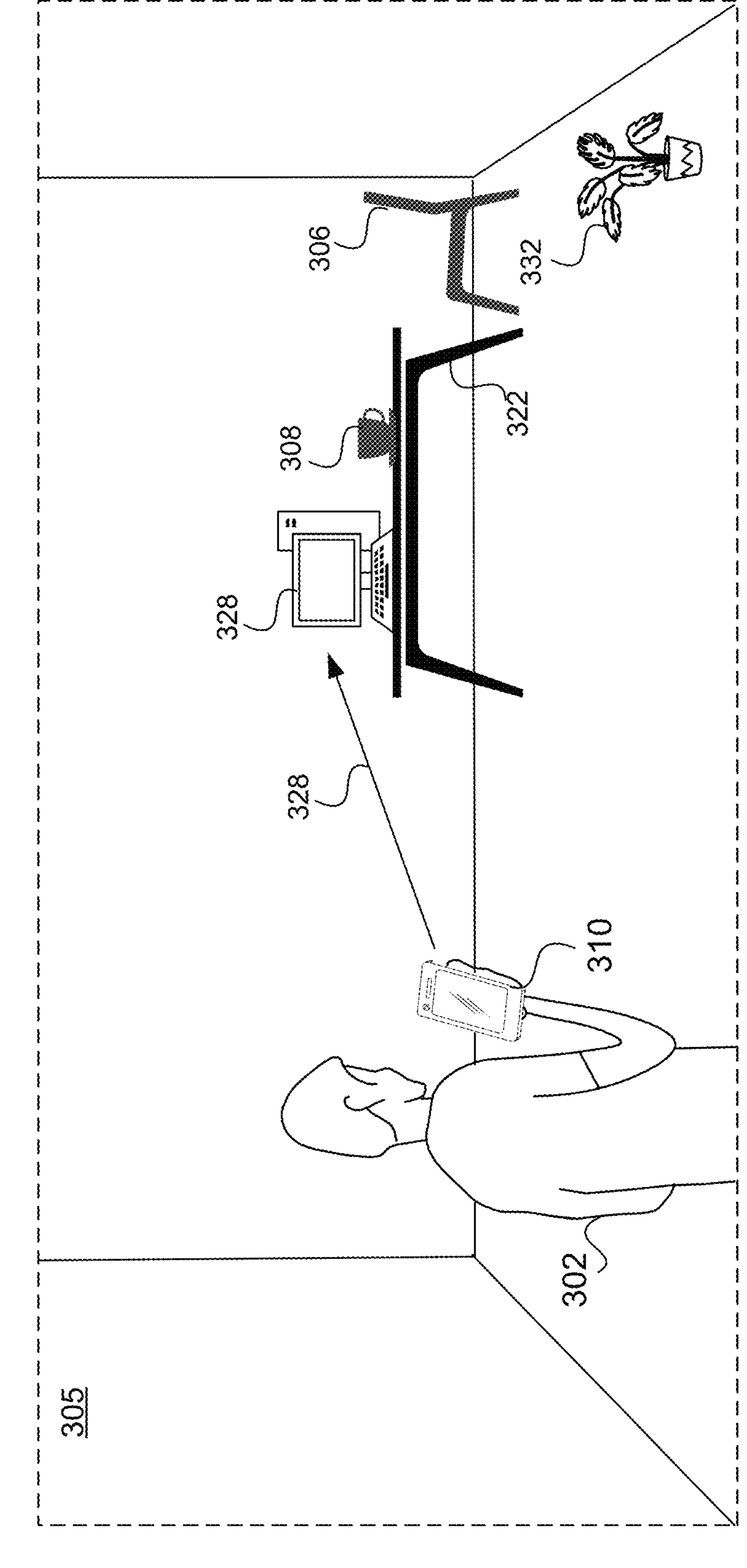
FIG. 3 illustrates an example process for detecting interactions between a user and an object, in accordance with some implementations.

FIG. 3 illustrates an example environment 300 in accordance with some implementations. The example environment 300 illustrates a process for detecting interactions (e.g., a visual interaction 328) between a user 302 and objects while using an electronic device (e.g., electronic device 310 as illustrated in FIG. 3). For example, interactions may be detected between the user 302 and objects such as a chair 324, a table 322, a computer 328, a virtual cup 308, a virtual chair 306, and/or a plant 332. The interactions between the user 302 and the objects may be detected to enable a process to determine a location of the user in a physical environment (example environment 300) as described, infra.

In some implementations, the process for detecting the interactions includes obtaining sensor data for detecting various aspects of the physical environment. For example, the user 302 may be using or wearing an electronic device 310 (e.g., a mobile device, a tablet computer, a smart watch, an HMD, etc.) while moving and/or interacting with one or more of the objects in the physical environment. During the movement or interactions, the electronic device 310 may be configured to capture images representing a portion of the physical environment within a view of the user 302 or otherwise around the user 302 in a particular direction, e.g., the general direction in which the user's head or face is oriented. Likewise, the electronic device 310 may be configured to retrieve sensor data describing movements of the user 302. Sensor data may collected from sensors such as image sensors, depth sensors, motion sensors, audio sensors, temperature sensors, GPS sensors, activity tracking sensors, optical sensors, etc. In some implementations, the sensors may be internal and/or external to the electronic device 310.

An interaction between the user and an object may be detected based on the sensor data describing movements of the user 302. In some implementations, the interactions may be determined based on detecting (via sensors) contact between the user 302 and an object such as, e.g., a hand or finger of the user touching an object. In some implementations, the interactions may be determined based on a position of the user (e.g., sitting, standing, leaning, etc.) with respect to an object. In some implementations, image data and/or other sensor data is interpreted to identify or estimate a distance between a portion of a user (e.g., a user's hand) and an object in a physical environment. In some implementations, based on detecting a pattern of motion over time, e.g., of a hand moving towards an object then stopping, and then retracting, a touch or other contact between the user and the object is identified. In some implementations, image and/or other sensor data is interpreted to identify or estimate that user motion caused a change in an object, e.g., sensor data interpreted to determine a hand moving towards an object and then a change in the object's position or other characteristic. In one example, sensor data is used to determine that a user's hand moved towards an object and then the object moved, which may be interpreted as indicia of user interaction with the object. In another example, sensor data is used to determine that a user's hand moved towards an electronic device and then a display of the electronic device changed (e.g., displaying new content), which may be interpreted as indicia of user interaction with the electronic device.

In some implementations, the interactions may be determined based on a changing orientation relative to an object (e.g., movement from: standing to sitting, left to right, walking to running, etc.). In some implementations, the interactions may be determined based on detection of a user gazing (e.g., the visual interaction 328 as illustrated in FIG. 3) at an object (e.g., the computer 328 as illustrated in FIG. 3) and/or detection of a time frame that an object remains within view, of the user 302. An algorithm or machine learning model may be enabled to interpret image and/or motion sensor data to detect object interactions. In some implementations (if a depth of objects within an environment is known (e.g., via light detection and ranging (LIDAR) or stereo depth techniques), object interactions may be detected when a distance between an object and a portion of a user (e.g., a hand, etc.) is determined to be within a threshold distance.

The example illustrated in FIG. 3 is associated with a process for determining a visual interaction 328 between the user 302 and a computer 328 in accordance with some implementations. Additionally, sensor data associated with a distance between user 302 and computer 328 may be retrieved to determine that user 302 is located within a predetermined distance from computer 328. For example, an image sensor of the electronic device 310 is enabled to detect that the user 302 is gazing (via eye movement detection) at a screen of the computer 328. Likewise, a distance sensor (e.g., an infrared sensor, an ultrasonic sensor, LIDAR, etc.) may be enabled to detect a distance between user 302 and 328. In response, computer code is executed and it is determined (based on analysis of a gaze direction and/or detected distance) that the user is currently interacting (e.g., reading or typing) with or will interact with the computer 328.

A gaze direction of a user may be determined based on sensor data capturing images or other information of one or both of a user's eyes. In one example, glint reflections are produces on a surface of a user's eye and used to determine a user's gaze direction towards an object within the physical environment 305 and/or a portion of a display that is then associated with an object in the physical environment 305. In another example, images of a user's eye (e.g., showing cornea surface, retina, etc.) are interpreted to determine an eye orientation relative to the device's current pose from which an object in the physical environment 305 at which the user's gaze is directed may be identified.

Figure 4:
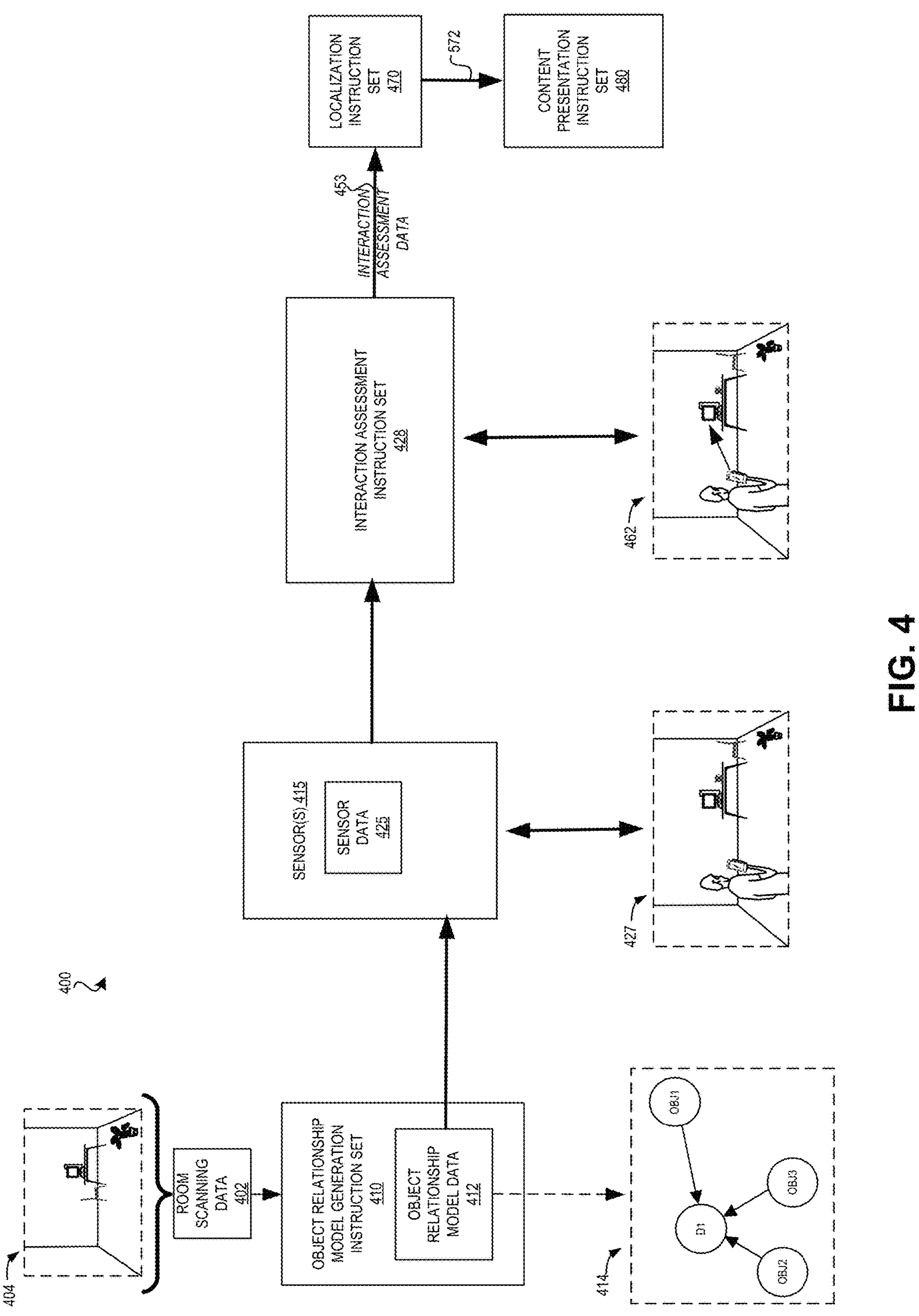
FIG. 4 illustrates a system flow diagram of an example environment in which a system can present content based on a detected user/object interaction location, in accordance with some implementations.

FIG. 4 illustrates a system flow diagram of an example environment 400 in which a system leverages scene understandings (e.g., object relationships represented in an object relationship model) to determine a location of a user within a physical environment according to some implementations. In response, content (e.g., audio or video), application suggestions, and/or suggested modified device operations (e.g., enable a do not disturb mode when a user is in a specified room, etc.) may be provided to the user (via an output device such as a display, a speaker, etc.) based on the determined location of the user. In some implementations, the system flow of the example environment 400 is performed on a device (e.g., device 110 of FIG. 1 or device 305 of FIG. 3), such as a mobile device or an HMD. Any images of the example environment 400 may be displayed on the device that has a screen for displaying images and/or a screen for viewing stereoscopic images such as an HMD. In some implementations, the system flow of the example environment 400 is performed on processing logic, including hardware, firmware, software, or a combination thereof. In some implementations, the system flow of the example environment 400 is performed on a processor executing code stored in a non-transitory computer-readable medium (e.g., a memory).

The overall system flow of the example environment 400 executes a process that acquires room scanning data (e.g., image data) from sensors for a plurality of physical environments (e.g., the physical environment 105 of FIG. 1) and generates an object relationship model, or any type of information that defines the relationships of objects between a set of objects such as a scene graph, for a portion of the physical environment (e.g., an office). The process is further configured to obtain data from sensors, detect an interaction between a user and an object within the physical environment, determine a location of the user (based on a comparison of the interaction and the object relationship model), and present content to the user (e.g., to enhance an extended reality (XR) environment) based on the location of the user.

In some implementations, an object relationship model enables referencing real and virtual objects in a similar way (e.g., for smart placement, giving commands to a virtual character, describe an XR scene, etc.). An object relationship model can aid in the processing efficiency of displaying an XR scene.

In an example implementation, the environment 400 includes an image composition pipeline that acquires or obtains (e.g., via short video scans or snippets) data (e.g., image data from image source(s)) of a physical environment from a sensor on a device (e.g., device 110 of FIG. 1 or device 305 of FIG. 3) as room scanning data 402. Room scanning data 402 is an example of acquiring image sensor data (e.g., light intensity data, depth data, and position information) for a plurality of image frames. For example, a user may acquire image data as the user is in a room in a physical environment (e.g., the physical environment 105 of FIG. 1). The images of the room scanning data can be displayed on the device that has a screen for displaying images and/or a screen for viewing stereoscopic images such as an HMD. The image source(s) may include a depth camera that acquires depth data of the physical environment, a light intensity camera (e.g., RGB camera) that acquires light intensity image data (e.g., a sequence of RGB image frames), and position sensors to acquire positioning information. For the positioning information, some implementations include a visual inertial odometry (VIO) system to determine equivalent odometry information using sequential camera images (e.g., light intensity data) to estimate the distance traveled.

In an example implementation, the environment 400 includes an object relationship model generation instruction set 410 that is configured with instructions executable by a processor to generate an object relationship model for each room scanning data received. For example, the object relationship model generation instruction set 410 obtains room scanning data 402 and generates object relationship model data 412. For example, the object relationship model generation instruction set 410 analyzes room scanning data 402 for a particular room (e.g., a room as illustrated in image 404) and generates a corresponding object relationship model for that particular room (e.g., object relationship model 414). Thus, the object relationship model data 412 includes a generated object relationship model 414 for a room included in the room scanning data 402. In some implementations, the object relationship model generation instruction set 410 generates a scene graph as an example for generating an object relationship model. The generation of a mixed environment object relationship model for an XR environment is described supra with reference to FIG. 2. The object relationship model data, e.g., scene graph, may identify the locations of one or more objects within a 3D or 2D coordinate system. In one example, such locations are relative to a 3D coordinate system corresponding to the physical environment. In another example, such locations are relative to a 2D top-down floor plan coordinate system of the physical environment.

In an example implementation, the system flow of the example environment 400 acquires sensor data 425 from sensors 415 detecting user activity within a physical environment such as a physical environment as illustrated in image 427. Sensors 415 may include any type of sensor including, inter alia, image sensors, motion sensors, audio sensors, temperature sensors, touch sensors, GPS sensors, activity tracking sensors, optical sensors, etc. In some implementations, the sensors may be internal and/or external to an electronic device.

In an example implementation, the environment 400 includes an interaction assessment instruction set 428 that is configured with instructions executable by a processor to obtain sensor data 425 detecting activity between a user and an object within a physical environment (e.g., depth data, user position data, user contact data, user orientation data, user gaze data, distance data, etc.) from e.g., sensor(s) 415. In some implementations, interaction assessment instruction set 428 is configured to execute an algorithm (implemented via specialized computer code) analyze the sensor data 425 and generate interaction assessment data 453 describing at least one interaction between a user and an object within a physical environment. For example, interaction assessment instruction set 428 is executed to determine (based on the sensor data 415) that a user is touching, looking at (via gaze, positioning, and/or orientation detection), and/or proximate a computer as illustrated in the physical environment 462.

In an example implementation, the environment 400 further includes a localization instruction set 470 that is configured with instructions executable by a processor to obtain interaction assessment data 453 (e.g., generated by interaction assessment instruction set 428) to determine a current location of the user. For example, the localization instruction set 470 analyzes the interaction assessment data 453 to determine that the user is interacting (or will interact) with a computer and therefore the user is located at a location adjacent to the computer. This location in turn may be used to localize the user with respect to other objects and/or the physical environment in which they are located. For example, the user's location within a 3D or 2D coordinate system may be determined based on the location of the object with which the user is interacting and the relative position of the user to that object. For example, based on a user interacting with an object at position x1, y1 on a top-down floorplan (e.g., retrieved via user input, scanned via sensors, downloaded from a server, etc.) of the physical environment, the user's current orientation relative to the object, and a prediction that the user is 2 feet from the object, the process may determine that the user is at position x2, y2 on the top-down floorplan.

In an example implementation, the environment 400 further includes a content presentation instruction set 480 that is configured with instructions executable by a processor to obtain a location of the user (e.g., adjacent to the computer) and generate content associated with the location of the user. For example, content may include audio or video content for presentation to the user via the computer as it has been determined that the user is located adjacent to the computer. Likewise, content may include HMD/mobile phone augmentations selected and/or positioned based on the location of the user, an activity associated with the location of the user, prior/habitual activity of the user at the location (e.g., an indication of user activity with respect to a specific time period such as a day or month), etc. HMD/mobile phone augmentations may include, inter alia, three dimensional (3D) bubbles, auto-correct controls, auto-fill controls, specialized audio controls, virtual touch/function bar controls, etc. Content including activities associated with a location of the user may include, for example, providing instructions for performing specific activities with respect to specific objects at a specific area of their living space. For example, instructions for operating gas fireplace may be provided to the user based on a user position being adjacent to the gas fireplace.

Figure 5A:
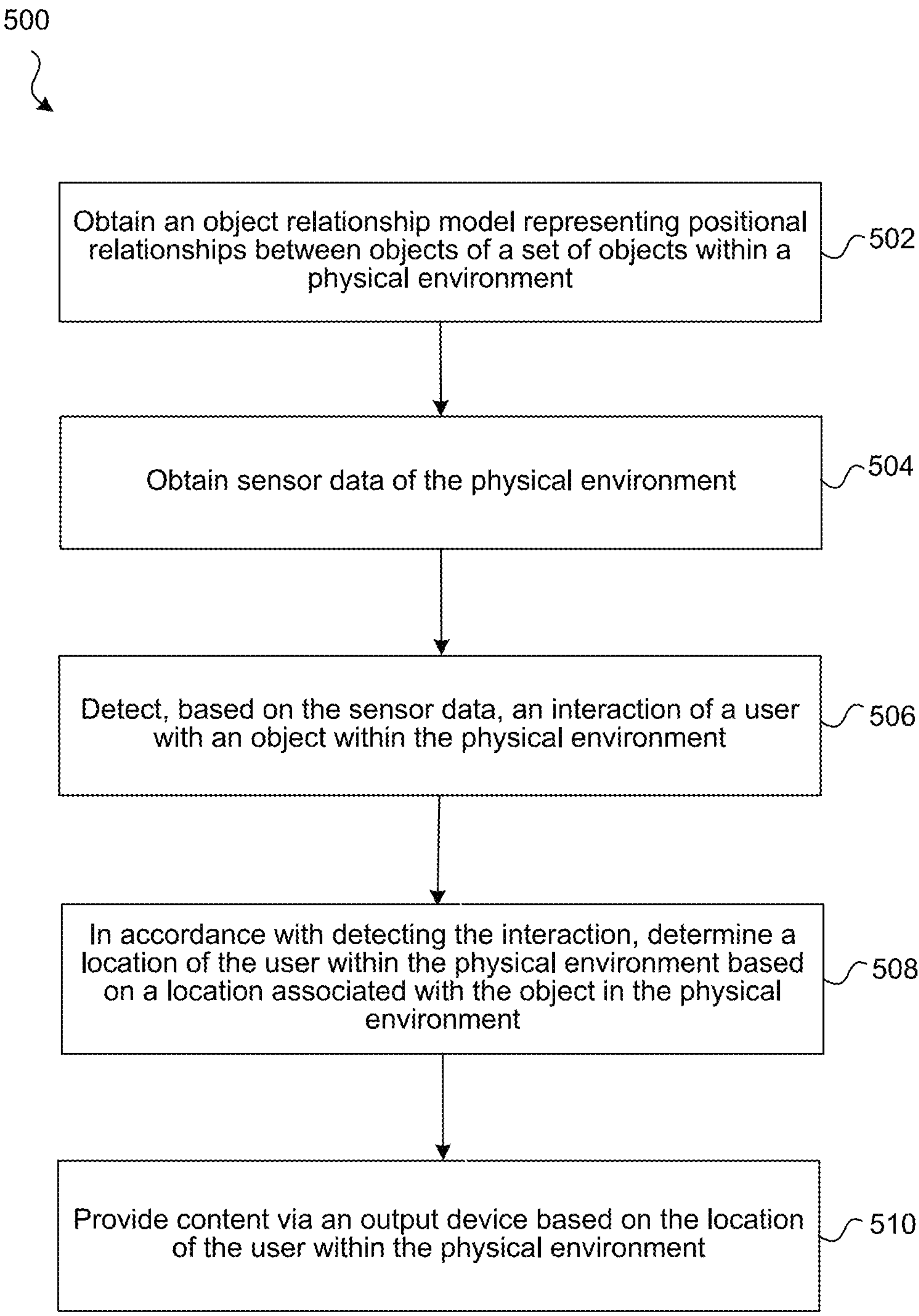
FIG. 5A is a flowchart representation of an exemplary method that presents content based on a detected user/object interaction location, in accordance with some implementations.

FIG. 5A is a flowchart representation of an exemplary method 500 that determines a location of user within physical environment based detected interactions with an object (s) in accordance with some implementations. In some implementations, the method 500 is performed by a device, such as a mobile device, desktop, laptop, or server device. In some implementations, the device has a screen for displaying images and/or a screen for viewing stereoscopic images such as a head-mounted display. In some implementations, the method 500 is performed by processing logic, including hardware, firmware, software, or a combination thereof. In some implementations, the method 500 is performed by a processor executing code stored in a non-transitory computer-readable medium (e.g., a memory). Each of the blocks in the method 500 may be enabled and executed in any order.

At block 502, the method 500 obtains an object relationship model representing positional relationships between objects (of a set of objects) within a physical environment. At least one object (in the set of objects) in the object relationship model may be associated with a location in the physical environment. In some implementations, the object relationship model may be generated based on a semantic understanding or room scanning process that utilizes images and/or depth data of a current room of the user. At least one of the objects may be a virtual and/or real object. In some implementations an object relationship block (e.g., a scene reasoning block) may generate a current XR object relationship model and/or positional relationships such as a chair facing a table, a cup on top of a table, a table adjacent to a wall, etc. A position (within a positional relationship) may comprise a 3-dimensional position or a 2-dimensional position such as e.g., a top down 2-dimensional floorplan.

An object relationship model may be generated by obtaining a representation of a physical environment generated based on multiple types of sensor data obtained during a scanning process. For example, sensor data may comprise a room scanning data, one or more images a current room of a user, depth data, etc. Subsequently, positions of a set of objects (e.g., chairs, tables, cups, wall structures such as, e.g., walls, doors, floor, etc.) in a physical environment are detected such that the object relationship model is generated based on the detected positions of the set of objects. The representation of a physical environment may be associated with semantic data that includes semantic labels identifying walls, wall attributes, objects, and classifications of objects of the physical environment.

At block 504, the method 500 obtains sensor data associated with the physical environment. For example, a user may be wearing a wearable device (e.g., an HMD) during motion (e.g., walking, running, etc.) or interacting with one or more of the objects in the physical environment. During user motion or interactions, the wearable device may be configured to capture images of a view of the user and sensor data of associated with movement of the wearable device and/or user. Sensor data may include, inter alia, image data collected from image sensors, motion related data collected from motion detector sensors, data collected from audio sensors, etc.

At block 506, the method 500 detects (based on the sensor data obtained at block 504) an interaction(s) of the user with an object(s) of the set of objects within the physical environment. Detecting the interaction may include identifying the object and determining an object location associated with the object within the physical environment based on analysis of the object relationship model. In some implementations, the interaction(s) may be determined based on detecting, inter alia, user/object contact (e.g., user hands on a computer), a user position (e.g., the user is sitting) or changing orientation relative to an object (e.g., a move from standing to sitting with a chair in a user view), a gaze of the user relative to an object, a time period that an object remains in view of the user, a distance between the object and the user, etc. An algorithm or machine learning model may interpret image and/or motion sensor data to detect object interactions.

At block 508, the method 500 (in accordance with detecting the interaction) determines a location (e.g., a specific location or region) of the user within the physical environment based on a location associated with the object in the physical environment.

At block 510, the method 500 provides content via an output device (e.g., a display, a speaker, etc.) of the electronic device based on the location of the user within the physical environment. For example, content may include wearable device/mobile phone augmentations selected and/or positioned based on a user location, an activity associated with the user location, user prior/habitual activity at the user location, etc. In some implementations, the content may include audio or visual content. In some implementations, the content may include augmented content selected based on the position of the user. In some implementations, the content may include augmented content positioned on a display of the electronic device based on the position of the user. In some implementations, the content may include activity-based content associated with the physical environment.

Figure 5B:
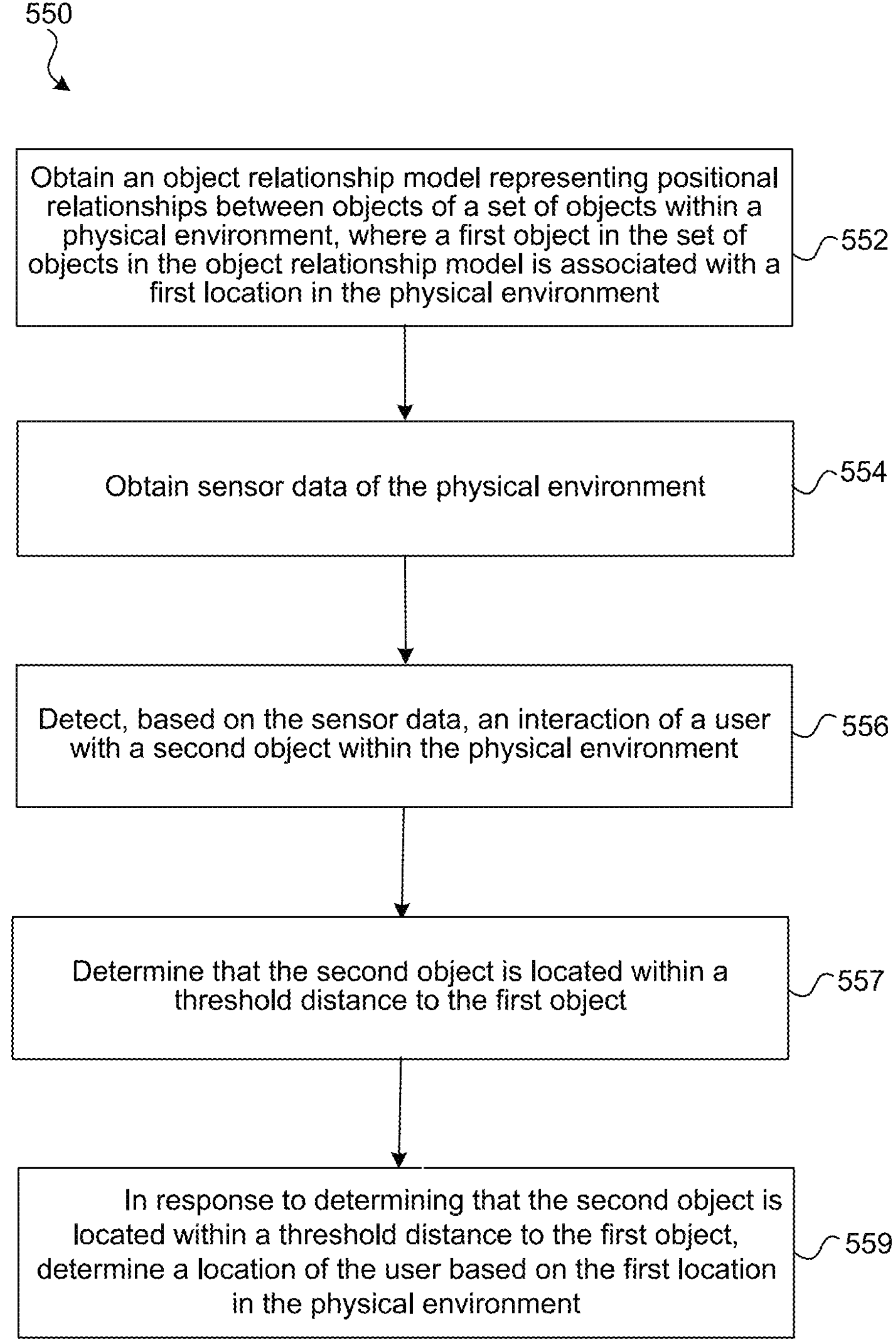
FIG. 5B is a flowchart representation of an exemplary method that determines a location of user within physical environment based detected interactions with positionally related object(s) in accordance with some implementations.

FIG. 5B is a flowchart representation of an exemplary method 550 that determines a location of user within physical environment based detected interactions with positionally related object(s) in accordance with some implementations. In some implementations, the method 550 is performed by a device, such as a mobile device, desktop, laptop, HMD, or server device. In some implementations, the device has a screen for displaying images and/or a screen for viewing stereoscopic images such as a head-mounted display. In some implementations, the method 550 is performed by processing logic, including hardware, firmware, software, or a combination thereof. In some implementations, the method 550 is performed by a processor executing code stored in a non-transitory computer-readable medium (e.g., a memory). Each of the blocks in the method 550 may be enabled and executed in any order.

At block 552, the method 550 obtains an object relationship model representing positional relationships between objects (of a set of objects) within a physical environment. In some implementations, a first object (of the set of objects) in the object relationship model is associated with a first (e.g., known) location in the physical environment. In some implementations, the object relationship model may be generated based on a semantic understanding or room scanning process that utilizes images and/or depth data of a current room of the user. At least one of the objects may be a virtual and/or real object. In some implementations an object relationship block (e.g., a scene reasoning block) may generate a current XR object relationship model and/or positional relationships such as a chair facing a table, a cup on top of a table, a table adjacent to a wall, etc. A position (within a positional relationship) may comprise a 3-dimensional position or a 2-dimensional position such as e.g., a top down 2-dimensional floorplan.

An object relationship model may be generated by obtaining a representation of a physical environment generated based on multiple types of sensor data obtained during a scanning process. For example, sensor data may comprise a room scanning data, one or more images a current room of a user, depth data, etc. Subsequently, positions of a set of objects (e.g., chairs, tables, cups, wall structures such as, e.g., walls, doors, floor, etc.) in a physical environment are detected such that the object relationship model is generated based on the detected positions of the set of objects. The representation of a physical environment may be associated with semantic data that includes semantic labels identifying walls, wall attributes, objects, and classifications of objects of the physical environment.

At block 554, the method 550 obtains sensor data associated with the physical environment. For example, a user may be wearing a wearable device during motion (e.g., walking, running, etc.) or interacting with one or more of the objects in the physical environment. During user motion or interactions, the wearable device may be configured to capture images of a view of the user and sensor data of associated with movement of the wearable device and/or user. Sensor data may include, inter alia, image data collected from image sensors, motion related data collected from motion detector sensors, data collected from audio sensors, etc.

At block 556, the method 550 detects (based on the sensor data obtained at block 554) an interaction(s) of the user with a second object of the set of objects within the physical environment. Detecting the interaction may include identifying the second object and determining an object location associated with the second object within the physical environment based on analysis of the object relationship model. In some implementations, the interaction(s) may be determined based on detecting, inter alia, user/object contact (e.g., user hands on a computer), a user position (e.g., the user is sitting) or changing orientation relative to an object (e.g., a move from standing to sitting with a chair in a user view), a gaze of the user relative to an object, a time period that an object remains in view of the user, a distance between the object and the user, etc. An algorithm or machine learning model may interpret image and/or motion sensor data to detect object interactions.

At block 557, the method 550 (in accordance with detecting the interaction) determines a that the second object is located within a threshold distance from the first object. In some implementations, the threshold distance is determined based on the sensor data. In some implementations, the threshold distance between the first object and the second object is determined based on a link between the first object and the second object within the object relationship model. In some implementations, the threshold distance between the first object and the second object is based on a semantic label representing the link in the object relationship model specifying a proximate relationship between the first object and the second object. In some implementations, the semantic label defines data describing near, on, on top of, touching, beside, adjacent, contacting, etc.

At block 559, the method 550 (in response to determining that the second object is located within a threshold distance to the first object) determines a location of the user based on the first location in the physical environment.

Figure 6:
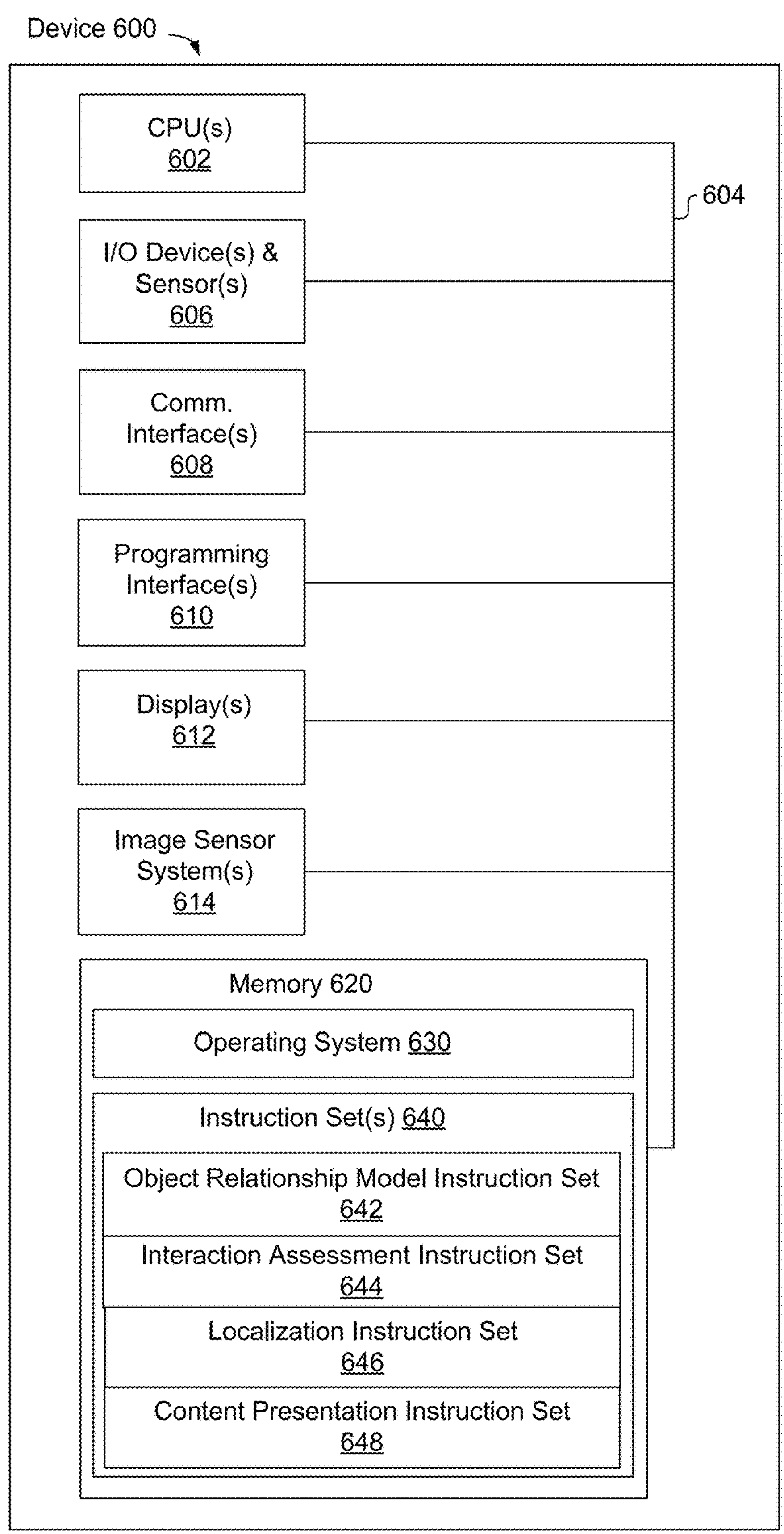
FIG. 6 is an example electronic device in accordance with some implementations.

FIG. 6 is a block diagram of an example device 600. Device 600 illustrates an exemplary device configuration for device 110 of FIG. 1 and/or device 305 of FIG. 3. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 600 includes one or more processing units 602 (e.g., microprocessors, ASICs, FPGAs, GPUS, CPUs, processing cores, and/or the like), one or more input/output (I/O) devices and sensors 606, one or more communication interfaces 608 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, 12C, and/or the like type interface), one or more programming (e.g., I/O) interfaces 610, one or more displays 612, one or more interior and/or exterior facing image sensor systems 614, a memory 620, and one or more communication buses 604 for interconnecting these and various other components.

In some implementations, the one or more communication buses 604 include circuitry that interconnects and controls communications between system components. In some implementations, the one or more I/O devices and sensors 606 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 612 are configured to present a view of a physical environment or a graphical environment to the user. In some implementations, the one or more displays 612 are configured to present content (determined based on a determined user/object location of the user within the physical environment) to the user. In some implementations, the one or more displays 612 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 612 correspond to diffractive, reflective, polarized, holographic, etc. waveguide displays. In one example, the device 600 includes a single display. In another example, the device 600 includes a display for each eye of the user.

In some implementations, the one or more image sensor systems 614 are configured to obtain image data that corresponds to at least a portion of the physical environment 105. For example, the one or more image sensor systems 614 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 614 further include illumination sources that emit light, such as a flash. In various implementations, the one or more image sensor systems 614 further include an on-camera image signal processor (ISP) configured to execute a plurality of processing operations on the image data.

In some implementations, the device 600 includes an eye tracking system for detecting eye position and eye movements (e.g., eye gaze detection). For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user. Moreover, the illumination source of the device 600 may emit NIR light to illuminate the eyes of the user and the NIR camera may capture images of the eyes of the user. In some implementations, images captured by the eye tracking system may be analyzed to detect position and movements of the eyes of the user, or to detect other information about the eyes such as pupil dilation or pupil diameter. Moreover, the point of gaze estimated from the eye tracking images may enable gaze-based interaction with content shown on the near-eye display of the device 600.

The memory 620 includes high-speed random-access memory, such as DRAM, SRAM, DDR RAM, or other random-access solid-state memory devices. In some implementations, the memory 620 includes non-volatile memory, such as one or more magnetic disk storage devices, optical disk storage devices, flash memory devices, or other non-volatile solid-state storage devices. The memory 620 optionally includes one or more storage devices remotely located from the one or more processing units 602. The memory 620 includes a non-transitory computer readable storage medium.

In some implementations, the memory 620 or the non-transitory computer readable storage medium of the memory 620 stores an optional operating system 630 and one or more instruction set(s) 640. The operating system 630 includes procedures for handling various basic system services and for performing hardware dependent tasks. In some implementations, the instruction set(s) 640 include executable software defined by binary information stored in the form of electrical charge. In some implementations, the instruction set(s) 640 are software that is executable by the one or more processing units 602 to carry out one or more of the techniques described herein.

The instruction set(s) 640 includes an object relationship model instruction set 642, an interaction assessment instruction set 644, a localization instruction set 646, and a content presentation instruction set 648. The instruction set(s) 640 may be embodied as a single software executable or multiple software executables.

The object relationship model instruction set 642 is configured with instructions executable by a processor to generate object relationship model data. For example, the object relationship model instruction set 642 can assess object detection data and room scanning data to generate an object relationship model for the 3D representation of the physical environment.

The interaction assessment instruction set 644 is configured with instructions executable by a processor to obtain and assess the object relationship model data from the object relationship model generation instruction set 642 with respect to sensor data to detect activity between a user and an object within a physical environment.

The interaction assessment instruction set 646 is configured with instructions executable by a processor to obtain interaction assessment data (e.g., generated by interaction assessment instruction set 644) to determine a current location of the user.

The content presentation instruction set 646 is configured with instructions executable by a processor to obtain the current location of the user (e.g., adjacent to the computer) and generate content associated with the location of the user.

Although the instruction set(s) 640 are shown as residing on a single device, it should be understood that in other implementations, any combination of the elements may be located in separate computing devices. Moreover, FIG. 6 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Returning to FIG. 1, a physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina.

Projection systems also may be configured to project virtual objects into the physical environment, for example, as a hologram or on a physical surface.

Those of ordinary skill in the art will appreciate that well-known systems, methods, components, devices, and circuits have not been described in exhaustive detail so as not to obscure more pertinent aspects of the example implementations described herein. Moreover, other effective aspects and/or variants do not include all of the specific details described herein. Thus, several details are described in order to provide a thorough understanding of the example aspects as shown in the drawings. Moreover, the drawings merely show some example embodiments of the present disclosure and are therefore not to be considered limiting.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or additionally, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel. The operations described in this specification can be implemented as operations performed by a data processing apparatus on data stored on one or more computer-readable storage devices or received from other sources.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

at an electronic device having a processor:

obtaining an object relationship model representing positional relationships between objects of a set of objects within a physical environment, wherein an object in the set of objects represented in the object relationship model is a physical object associated with a location in the physical environment;

obtaining sensor data of the physical environment;

detecting, based on the sensor data, that at least a portion of a user is within a threshold distance from the object in the set of objects within the physical environment;

determining a location of the user within the physical environment based on the threshold distance and the location associated with the object in the set of objects within the physical environment; and adjusting an operation of the electronic device based on the location of the user within the physical environment.

2. The method of claim 1, further comprising:

detecting, based on the sensor data, an interaction between the user and the object, wherein said detecting the interaction comprises detecting that that the at least a portion of the user and is within the threshold distance from the object and detecting contact between the user and the object.

3. The method of claim 1, further comprising:

detecting, based on the sensor data, an interaction between the user and the object, wherein said detecting the interaction comprises detecting that that the at least a portion of the user and is within the threshold distance from the object and detecting a position of the user relative to the object.

4. The method of claim 1, further comprising:

detecting, based on the sensor data, an interaction between the user and the object, wherein said detecting the interaction comprises detecting that that the at least a portion of the user and is within the threshold distance from the object and detecting a change in orientation of the user relative to the object.

5. The method of claim 1, further comprising:

detecting, based on the sensor data, an interaction between the user and the object, wherein said detecting the interaction comprises detecting that that the at least a portion of the user and is within the threshold distance from the object and detecting a gaze of the user relative to the object.

6. The method of claim 1, further comprising:

detecting, based on the sensor data, an interaction between the user and the object. wherein said detecting the interaction comprises detecting that that the at least a portion of the user and is within the threshold distance from the object and detecting a time period associated with the object being in a view of the user.

7. The method of claim 1, further comprising:

detecting, based on the sensor data, an interaction between the user and the object, wherein said detecting the interaction comprises detecting that that the at least a portion of the user and is within the threshold distance from the object and detecting a distance between the object and a portion of the user.

8. The method of claim 1, wherein the sensor data comprises image data collected from image sensors.

9. The method of claim 1, wherein the sensor data comprises motion related data collected from motion detector sensors.

10. The method of claim 1, wherein the sensor data comprises audio data collected from audio sensors.

11. The method of claim 1, wherein the object relationship model is generated by:

obtaining a representation of the physical environment that was generated based on multiple types of sensor data obtained during a scanning process;

detecting positions of the set of objects in the physical environment; and generating the object relationship model based on the detected positions of the set of objects.

12. The method of claim 11, wherein the representation is associated with semantic data that includes semantic labels identifying walls, wall attributes, objects, and classifications of the objects of the physical environment.

13. The method of claim 11, wherein the multiple types of sensor data comprise depth data and light intensity image data obtained during the scanning process.

14. The method of claim 1, further comprising:

detecting, based on the sensor data, an interaction between the user and the object, wherein said detecting the interaction comprises:

detecting that that the at least a portion of the user and is within the threshold distance from the object;

identifying the object; and determining an object location associated with the object within the physical environment based on analysis of the object relationship model.

15. The method of claim 1, further comprising:

providing content via an output device of the electronic device based on the location of the user within the physical environment.

16. An electronic device comprising:

a non-transitory computer-readable storage medium; and one or more processors coupled to the non-transitory computer-readable storage medium, wherein the non-transitory computer-readable storage medium comprises program instructions that, when executed on the one or more processors, cause the electronic device to perform operations comprising:

obtaining an object relationship model representing positional relationships between objects of a set of objects within a physical environment, wherein an object in the set of objects represented in the object relationship model is a physical object associated with a location in the physical environment;

obtaining sensor data of the physical environment;

detecting, based on the sensor data, that at least a portion of a user is within a threshold distance from the object in the set of objects within the physical environment;

determining a location of the user within the physical environment based on the threshold distance and the location associated with the object in the set of objects within the physical environment; and adjusting an operation of the electronic device based on the location of the user within the physical environment.

17. A non-transitory computer-readable storage medium, storing program instructions executable by one or more processors to perform operations comprising:

at an electronic device having a processor:

obtaining an object relationship model representing positional relationships between objects of a set of objects within a physical environment, wherein an object in the set of objects represented in the object relationship model is a physical object associated with a location in the physical environment;

obtaining sensor data of the physical environment;

detecting, based on the sensor data, that at least a portion of a user is within a threshold distance from the object in the set of objects within the physical environment;

determining a location of the user within the physical environment based on the threshold distance and the location associated with the object in the set of objects within the physical environment; and adjusting an operation of the electronic device based on the location of the user within the physical environment.

18. The method of claim 1, further comprising:

detecting, based on the sensor data, an interaction between the user and the object, wherein the interaction comprises a physical interaction.

19. The method of claim 1, further comprising:

detecting, based on the sensor data, an interaction between the user and the object. wherein the interaction comprises a visual interaction.

* * * * *